United States Patent [19]
Sihon

[11] 3,789,743
[45] Feb. 5, 1974

[54] ECCENTRIC PIN BEARING
[75] Inventor: Tanas M. Sihon, Ypsilanti, Mich.
[73] Assignee: General Motors Corporation, Detroit, Mich.
[22] Filed: Feb. 28, 1972
[21] Appl. No.: 229,695

[52] U.S. Cl............... 92/187, 92/238, 308/2, 308/237
[51] Int. Cl............. F16j 1/16, F16c 11/00
[58] Field of Search.. 308/2, 237; 92/187, 190, 219, 92/238; 287/20 P

[56] References Cited
UNITED STATES PATENTS

| 212,665 | 2/1879 | Defreest | 308/237 X |
| 1,341,938 | 6/1920 | Shoemaker | 308/237 |
| 2,483,765 | 10/1949 | Hamel | 308/237 X |
| 3,053,595 | 9/1962 | Dilworth | 92/216 |
| 3,119,640 | 1/1964 | Laudig | 308/237 X |
| 3,476,021 | 11/1969 | Williams | 287/20 P |
| 3,555,972 | 1/1971 | Hulsing | 92/190 X |

FOREIGN PATENTS OR APPLICATIONS

| 895,694 | 4/1944 | France | 308/237 |
| 639,570 | 6/1950 | Great Britain | 308/237 |

Primary Examiner—Irwin C. Cohen
Attorney, Agent, or Firm—Robert J. Outland

[57] ABSTRACT

In a preferred embodiment, a trunnion-type piston pin is eccentrically received in the cylindrical bore of a piston member having bifurcated arms encircling and engaging the lower side of the piston pin. An arcuate bearing segment is received in a saddle portion of the piston member bore between it and the piston pin to transfer combustion loads therebetween. The bearing segment is of varying thickness having arcuate inner and outer surfaces formed on the centers of and engaging the surfaces of the piston pin and piston member bore, respectively. The arrangement permits provision for a partial insert bearing using a cylindrical piston pin bore and piston pin for simplicity of manufacture. Simple means for securing the bearing segments in the saddle portion and other features are provided.

5 Claims, 2 Drawing Figures

PATENTED FEB 5 1974  3,789,743

ECCENTRIC PIN BEARING

FIELD OF THE INVENTION

This invention relates to wrist pin bearings of the type wherein a segmental bearing member is utilized to absorb loads in one direction between load-transmitting members.

In a more particular aspect, the invention relates to wrist pin bearings of the type used between a connecting rod and its associated piston or other reciprocating member. More specifically, the invention relates to trunnion-type piston pin connections involving the use of an insert bearing segment.

BACKGROUND OF THE INVENTION

It is known in the art relating to pin bearings wherein the major loads are carried in one direction between two connected members to provide a bearing insert segment which acts to transmit the loads in the primary load direction, while direct contact between the load transmitting parts is used to transmit minor loads in other than the primary direction.

Such prior art arrangements are exemplified by U.S. Pat. Nos. 3,476,021 Williams and 3,555,972 Hulsing, both assigned to the assignee of the present invention. These patents disclose somewhat different types of piston constructions, both of which use a so-called trunnion-type piston pin connection wherein a piston pin, nonmovably secured to an engine connecting rod, is oscillatably retained within the transverse bore of a major load carrying member of a piston assembly.

In each case, a separate bearing segment is retained within the piston member and engaged by the piston pin so as to carry the major thrust loads acting between the piston and piston pin. Transmission of loads in the opposite direction is accomplished by direct contact between the piston pin and its associated piston member, which includes portions that encircle the opposite ends of the piston pin adjacent the ends of the connecting rod.

Such constructions as are shown in the above-mentioned patents are particularly adapted for use in two-cycle engines wherein the loads acting on the piston and connecting rod assembly are primarily compressive in nature. However, such arrangement could equally well be used in other machines, such as compressors or the like where the primary loading is in one direction between the connected members.

In the prior art, such as that previously described, the use of an arcuate bearing segment rather than a full bearing sleeve has resulted in the need to provide a transverse pin receiving opening which, rather than being a true cylindrical bore, is formed with a recess along one side sufficiently deep to provide for the insertion of the bearing segment, which is commonly known in this instance as an insert. The provision of the recess for the bearing insert complicates the manufacture of such piston constructions, since the segment recess is generally machined in a broaching operation to provide the proper square-edged shape for retention of the bearing insert. The use of the broaching step adds complexity and expense to the manufacture of such pin bearing assemblies.

SUMMARY OF THE INVENTION

The present invention provides a pin bearing construction which may be used in piston pin assemblies or other appropriate bearing locations. This construction provides for the use of a segmental bearing insert in an arrangement that eliminates the need for provision of a special recess to receive the insert in the transverse bore of the pin receiving member and thereby eliminates the requirement of broaching or other special machining operations in the manufacture of the pin bearing assembly.

Pin bearing constructions according to this invention involve the provision of a cylindrical bore in the pin receiving member which is substantially larger than the diameter of the mating cylindrical wrist pin, which may be of the trunnion type or some other known arrangement of gudgeon or wrist pin. The wrist pin is located eccentrically within the bore with its clearance substantially taken up in the unloaded or lightly loaded direction of the assembly. An arcuate bearing segment insert is provided between the pin and the wall of the bore of the pin receiving member in the path of transmission of the heavy load forces through the assembly. The bearing insert is of varying thickness being generally thickest at its center and thinner toward its ends so that it substantially fills the clearance space between the eccentrically disposed piston pin and bore. In this position, the insert is arranged with its convex arcuate inner surface centered on the axis of the piston pin and its concave arcuate outer surface centered on the axis of the pin receiving member bore.

In order to retain the bearing insert in position in the bore of the pin receiving member, a pair of small recesses may be provided which are preferably located about the center of the length of the bearing insert with one at each of its edges so as to receive slightly deformed portions of the bearing edges to retain the insert in position.

These and other features and advantages of the invention will be more fully understood from the following description of a preferred embodiment taken together with the accompanying drawing.

DESCRIPTION OF THE PREFERRED EMBODIMENT

Figure 1:
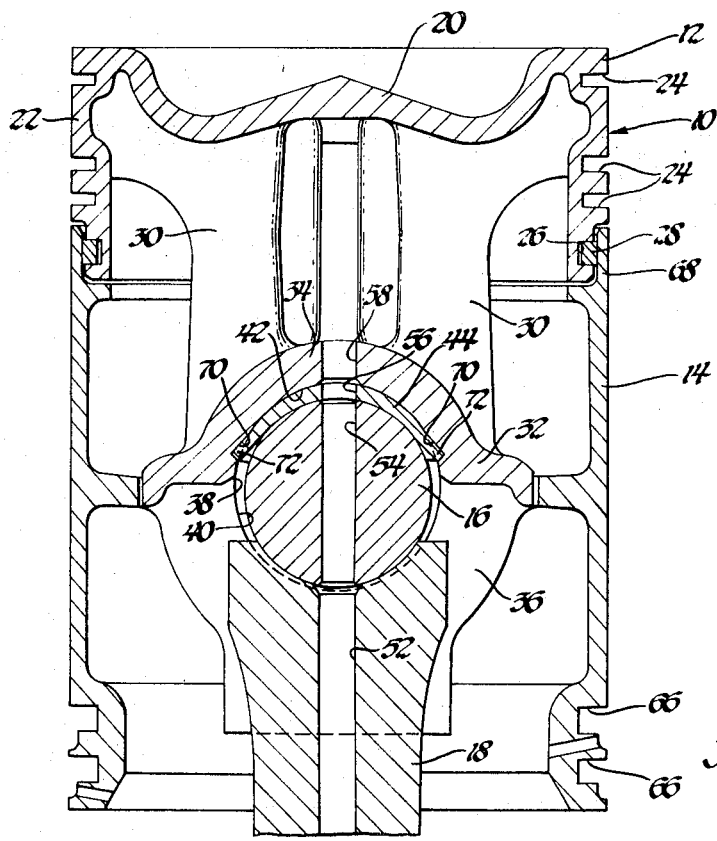
FIG. 1 is a transverse cross-sectional view of a piston-connecting rod assembly having pin bearing means according to the invention, the view being taken in the plane transverse to the axis of the piston pin.
Figure 2:
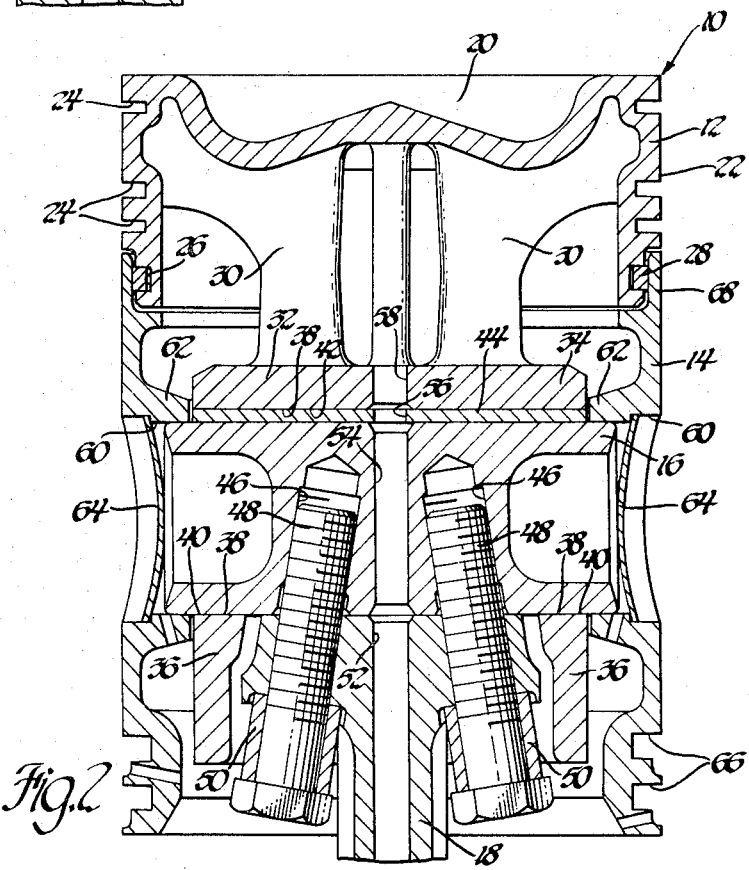
FIG. 2 is a cross-sectional view of the assembly of FIG. 1 taken in a plane along the axis of the piston pin.

Referring now to the drawing in detail, numeral 10 generally indicates a piston-connecting rod assembly of the type having pin bearing means according to the invention. In the present instance, the piston is of the crosshead type construction disclosed in the previously mentioned U. S. Pat. No. 3,555,972 Hulsing. However, it should be understood that the pin bearing arrangement of this invention might equally well be used in numerous other types of piston and other component constructions.

The piston of assembly 10 includes separate head and skirt members 12 and 14, respectively, which are maintained in assembly by a trunnion-type piston pin 16 secured to a connecting rod 18 of an internal combustion engine.

The head member 12 of the piston assembly includes a recessed crown portion 20 connected at its perimeter with the depending wall portion 22 which forms a ring belt having a plurality of compression ring grooves 24. The lower end of wall portion 22 is reduced in diameter and is provided with an external annular groove 26 in which there is carried a seal ring 28 for a purpose to be subsequently described.

The crown and wall portions 20, 22 of the head member are connected through struts or columns 30 with a piston pin connecting portion 32 that includes a central saddle portion 34 terminating laterally in a pair of bifurcated arms 36. A generally cylindrical bore 38 extends laterally through the saddle portion and bifurcated arms forming a pair of pin-receiving openings 40 through the arms with a downwardly facing arcuate recess 42 in the saddle portion intermediate the arms 36.

Within the upper portion of the bore 38 there is received an arcuate bearing segment insert 44 which extends laterally the length of the saddle portion, engaging the downwardly facing surfaces of the saddle portion arcuate recess 42 and the upper portions of the pin receiving openings 40 which make up the pin receiving bore 38. Bearing segment 44 is generally thicker at its center and thinner toward its edges, being formed with a convex arcuate outer surface and a concave arcuate inner surface which are formed on different axes, as will be subsequently more fully described.

Piston pin 16 is received within transverse bore 38 engaging the concave inner surface of the bearing insert along the piston pin's surfaces. The lower surface of the pin 16 extends into close proximity with the lower portions of the bore 38 in pin receiving openings 40 with a slight working clearance therebetween, but capable of making linear contact with the walls of the bore in the bifurcated arms 36. The ends of the pin are hollowed out to reduce weight. However, the central portion is solid and is provided with a pair of angled threaded holes 46 which are engaged by bolts 48 that cooperate with spacers 50 to secure the connecting rod 18 to the piston pin 16. The rod 18 is secured to the pin intermediate arms 36 and acts to maintain the assembly together. An oil passage 52 in the connecting rod is aligned with a connecting passage 54 through the piston pin which in turn connects through an opening 56 in the bearing insert with a connecting opening 58 in the piston member saddle to provide a path for piston cooling oil to be supplied to the piston interior.

The ends of the piston pin 16 extend beyond the saddle portion and bifurcated arms of the piston member and are received within cylindrical openings 60 provided in bosses 62 of the piston skirt 14. The outer ends of these openings are provided with closure plates 64 to prevent the escape of lubricating oil from the piston interior.

The skirt member is adapted to absorb substantially all the side thrust forces applied to the piston during movement of the connecting rod through the supporting connection between the piston pin and the skirt boss openings. The lower portion of the skirt is provided with oil ring grooves 66 while the upper portion includes an upward annular extension 68 which surrounds the reduced diameter portion of the piston member ring belt wall 22 and is engaged by the seal ring 28 so as to prevent the escape of cooling oil from the piston interior to the external walls.

Adjacent the edges of the bearing insert 44 and approximately centered intermediate its ends, two short angular recesses 70 are provided in the otherwise arcuate surface of the saddle portion recess 42 which receives the bearing segment 44. At these points, short lengths of the bearing wall edges are deformed, as at 72 so as to extend into the recesses 70 and maintain the insert bearing in position in the head member saddle portion. While the portion 72 may be deformed into position upon assembly, it is preferable that the bearing be preformed to its final shape so that the insert may be merely snapped in place during assembly to be retained thereafter by the cooperation of the deformed portion 72 with the recesses 70.

With the arrangement as described, it is noted that the openings 60 in the piston skirt have an axis which is substantially the same as that of the piston pin 16 and which is also the axis of the convex inner surface of the insert bearing 44 as it is installed in the assembly. The transverse bore 38 which extends through arms 36 and saddle portion 34 of the piston member has, however, an axis spaced slightly above that of the piston pin since the piston pin is located eccentrically of the bore 38, having the lower surface of the piston pin in or near contact with the lower surface of the bore 38 in the bifurcated arms 36. As previously mentioned, the space between the upper surface of the piston pin and the saddle portion recess is filled by the bearing insert 44, the upper surface of which conforms to the saddle portion recess and accordingly shares an axis with the bore 38.

The result of the above construction is that manufacture of the piston assembly is simplified, since the opening 38 in which the piston pin and bearing insert are located may be formed by a simple boring operation, thus avoiding the need for broaching or other more complicated machining operations utilized in the prior art arrangements. The recesses 70 by which the insert 44 is maintained in an installed position may be provided by simple milling operations resulting in a less expensive and simplified manufacturing procedure for the complete assembly. The manner of retaining the piston pin to the connecting rod is also simplified over certain of the prior art constructions.

While the invention has been described by reference to a preferred embodiment showing the application of the pin bearing assembly to a so-called crosshead type piston, it should be recognized that the inventive concepts disclosed are applicable in numerous other constructions where a pin bearing may be utilized. Accordingly, it is desired that the invention not be limited by the specific arrangement disclosed, but that the invention be given its full scope as permitted by the language of the following claims.

I claim:

1. In an oscillating pin bearing construction for transmitting forces between a piston and a connecting rod, a first member having a cylindrical bore therein, an arcuate bearing member retained along one side of said bore and in load transmitting relation therewith, and a cylindrical pin member eccentrically disposed in said bore and in load transmitting relation with said bearing member, said pin member being of sufficient diameter to fill the transverse dimension of said bore between said bearing member and the opposite side of said bore, except for operating clearance, said bearing member having a cylindrical convex outer surface mating with and in opposed load transmitting relation to the surface of said bore and centered on the axis thereof and said bearing member having a cylindrical concave inner surface mating with and in opposed load transmitting relation to the surface of said pin member and centered on the axis thereof, whereby loads in one direction between said pin member and said first member are transmitted through said bearing member, while loads in the opposite direction are transmitted through direct contact between said first member and said pin member.

2. A piston pin bearing assembly for an internal combustion engine, said bearing assembly comprising a piston member having a load transmitting portion with a cylindrical bore therein, a cylindrical piston pin eccentrically disposed in said bore and in load transmitting engagement with the wall thereof at one position of the circumference of said bore, and an arcuate bearing segment extending between said pin and said bore wall at points generally opposite the position of engagement between said pin and said bore wall, said bearing segment having a convex outer surface in load transmitting engagement with said bore wall and centered on the axis thereof and said bearing segment having a concave inner surface in load transmitting engagement with said pin and centered on the axis thereof.

3. The assembly of claim 2 wherein said piston member includes a pair of recesses in the bore portions at the arcuately opposite edges of said bearing segment, said segment edges having deformed portions received within said recesses to retain said segment in position in said bore.

4. A piston assembly for an internal combustion engine, said assembly comprising a piston member having a pin receiving portion including a central saddle portion with bifurcated arms extending therefrom and a transverse cylindrical bore through said arms and saddle portion forming pin receiving openings in said arms and a coaxial recess in said saddle portion intermediate said arms, a cylindrical pin received in said piston member bore and extending into both said pin receiving openings, said pin being of substantially smaller diameter than said bore and being eccentrically disposed therein with the clearance being largely taken up on the side of said openings away from the coaxial recess of said saddle portion, and an arcuate bearing segment disposed in said bore and engaging the inner surface of said bore and the outer surface of said piston pin, said bearing segment being of varying thickness to conform to the clearance space between the eccentrically disposed surfaces of said pin and bore.

5. The assembly of claim 4 and further comprising a connecting rod secured to said pin intermediate said bifurcated arms and maintaining said pin in assembly with said piston member, and locking recesses formed in the cylindrical surface of said bore, said bearing segment having cooperating deformations at its arcuately opposite edges, engaging said locking recesses to retain said bearing segment within said bore.

* * * * *